US009216461B2

(12) United States Patent
Athad

(10) Patent No.: US 9,216,461 B2
(45) Date of Patent: Dec. 22, 2015

(54) CUTTING BODY CONFIGURED FOR FINE-TUNING AND METAL-WORKING MACHINE TOOL COMPRISING A PLURALITY THEREOF

(75) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 749 days.

(21) Appl. No.: 13/542,915

(22) Filed: Jul. 6, 2012

(65) Prior Publication Data

US 2013/0022414 A1   Jan. 24, 2013

Related U.S. Application Data

(60) Provisional application No. 61/509,261, filed on Jul. 19, 2011.

(51) Int. Cl.
  *B23C 5/06*    (2006.01)
  *B23C 5/22*    (2006.01)
  (Continued)

(52) U.S. Cl.
  CPC . *B23C 5/006* (2013.01); *B23C 5/08* (2013.01); *B23C 5/24* (2013.01); *B23D 61/065* (2013.01); *Y10T 29/49* (2015.01); *Y10T 83/9321* (2015.04); *Y10T 407/1928* (2015.01)

(58) Field of Classification Search
  CPC ............ B23C 5/006; B23C 5/08; B23C 5/24; Y10T 407/1928; Y10T 83/9321; B23D 61/065
  USPC ......... 407/65, 101, 44, 36, 39, 12, 15, 16, 25, 407/110; 83/836
  See application file for complete search history.

(56) References Cited

U.S. PATENT DOCUMENTS

| 197,325 | A | * | 11/1877 | Brown | .................. B23D 61/065 |
| | | | | | 83/836 |
| 301,986 | A | * | 7/1884 | Hilton | .................. B23D 61/065 |
| | | | | | 83/836 |

(Continued)

FOREIGN PATENT DOCUMENTS

| DE | 36 07 528 C1 | 1/1987 |
| DE | 100 11 113 A1 | 9/2001 |

(Continued)

OTHER PUBLICATIONS

International Search Report dated Oct. 29, 2012 issued in PCT counterpart application (No. PCT/IL2012/000276).

(Continued)

*Primary Examiner* — Sunil K Singh
*Assistant Examiner* — Sara Addisu
(74) *Attorney, Agent, or Firm* — Womble Carlyle Sandridge & Rice PLLC

(57) ABSTRACT

A cutting body for a metal-working machine tool includes a cutting portion extending from a body portion. The body portion is configured to fine-tune the position of the cutting portion. The body portion includes an inner sub-portion and an outer sub-portion disposed between the inner sub-portion and the cutting portion. The outer sub-portion includes adjacent first and second sections. The first section is configured to elastically bend, extends between the inner sub-portion and the cutting portion, and comprises a face adjacent the second section. The second section includes a biasing surface and a biasing sub-portion configured to hold a biasing member. When the biasing sub-portion is moved due to biasing of the biasing member against the biasing surface, the first section is configured to bend and thereby change position of the cutting portion extending therefrom and allow fine-tuning thereof.

20 Claims, 2 Drawing Sheets

(51) Int. Cl.
  *B23D 43/06* (2006.01)
  *B23C 5/00* (2006.01)
  *B23C 5/08* (2006.01)
  *B23C 5/24* (2006.01)
  *B23D 61/06* (2006.01)

(56) References Cited

U.S. PATENT DOCUMENTS

| | | | | |
|---|---|---|---|---|
| 1,495,067 | A * | 5/1924 | Conklin | 407/25 |
| 2,544,920 | A * | 3/1951 | Fullerton | 83/838 |
| 3,023,486 | A * | 3/1962 | Bogner | 407/39 |
| 4,218,159 | A * | 8/1980 | Langen | 407/25 |
| 4,464,086 | A * | 8/1984 | Bentjens | 407/25 |
| 4,547,100 | A | 10/1985 | Naccarato et al. | |
| 4,563,929 | A * | 1/1986 | Ringlee et al. | 83/840 |
| 4,623,284 | A * | 11/1986 | Greiff | 407/38 |
| 4,728,228 | A * | 3/1988 | Okunishi et al. | 407/35 |
| 5,090,845 | A * | 2/1992 | Bentjens | 407/52 |
| 5,201,353 | A * | 4/1993 | Weill | 144/236 |
| 5,957,176 | A * | 9/1999 | Stein | 144/230 |
| 6,056,484 | A | 5/2000 | Mitchell | |
| 6,431,799 | B1 | 8/2002 | Francis et al. | |
| 6,702,526 | B2 | 3/2004 | Gamble et al. | |
| 6,902,357 | B2 * | 6/2005 | Blessing et al. | 408/204 |
| 7,086,812 | B2 | 8/2006 | Gamble et al. | |
| 7,216,682 | B1 * | 5/2007 | Bennington | 144/24.12 |
| 7,311,478 | B2 | 12/2007 | Erickson et al. | |
| 7,402,010 | B2 | 7/2008 | Bauer et al. | |
| 8,096,734 | B2 * | 1/2012 | Sjoo | 407/23 |
| 8,388,270 | B2 * | 3/2013 | Waggle et al. | 407/49 |
| 8,985,916 | B2 * | 3/2015 | Kocherovsky et al. | 408/154 |
| 2010/0104382 | A1 * | 4/2010 | Heinloth et al. | 407/16 |
| 2011/0243671 | A1 * | 10/2011 | Kretschmer | 407/25 |
| 2012/0076599 | A1 * | 3/2012 | Heinloth et al. | 409/131 |
| 2012/0082519 | A1 * | 4/2012 | Hecht | 407/33 |
| 2012/0321397 | A1 * | 12/2012 | Sjoo | 407/29 |
| 2014/0178136 | A1 * | 6/2014 | Mokthar | 407/51 |

FOREIGN PATENT DOCUMENTS

| | | |
|---|---|---|
| SU | 1 502 212 A1 | 8/1989 |
| WO | WO 2009/048098 A1 | 4/2009 |

OTHER PUBLICATIONS

Official Action dated Jun. 26, 2015 issued in Chinese counterpart application (No. 201280035675.9) with English translation.
Search Report dated Jun. 26, 2015 issued in Chinese counterpart application (No. 201280035675.9) with English translation.

* cited by examiner

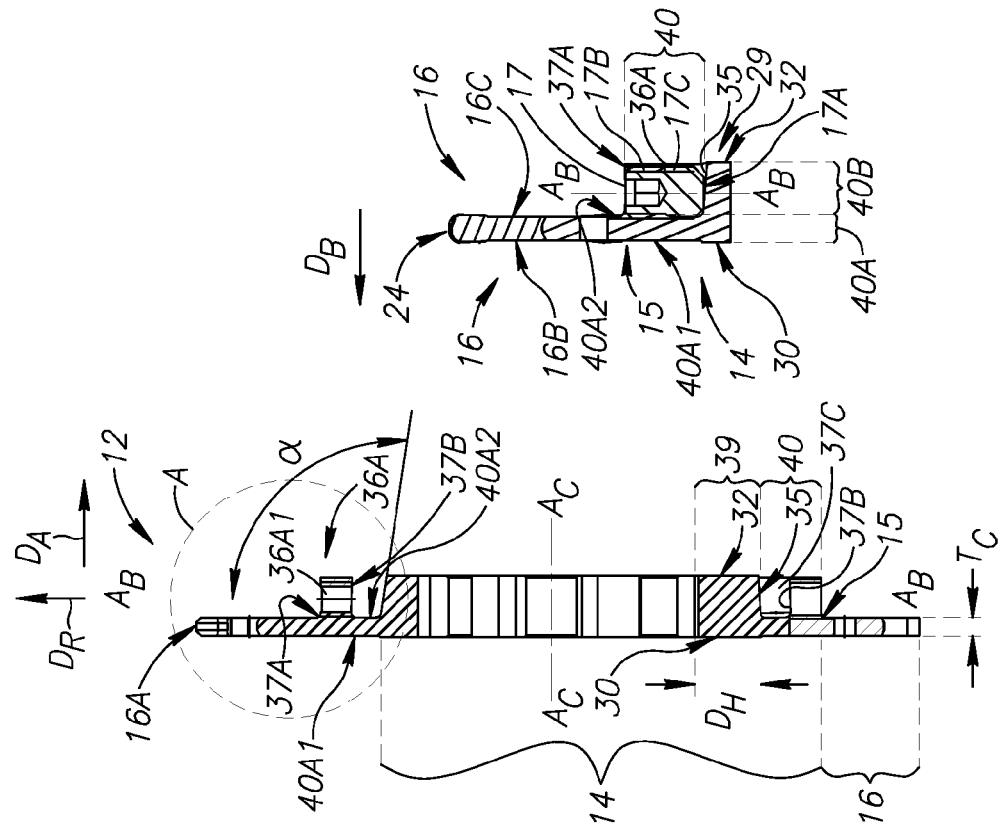
FIG.2A
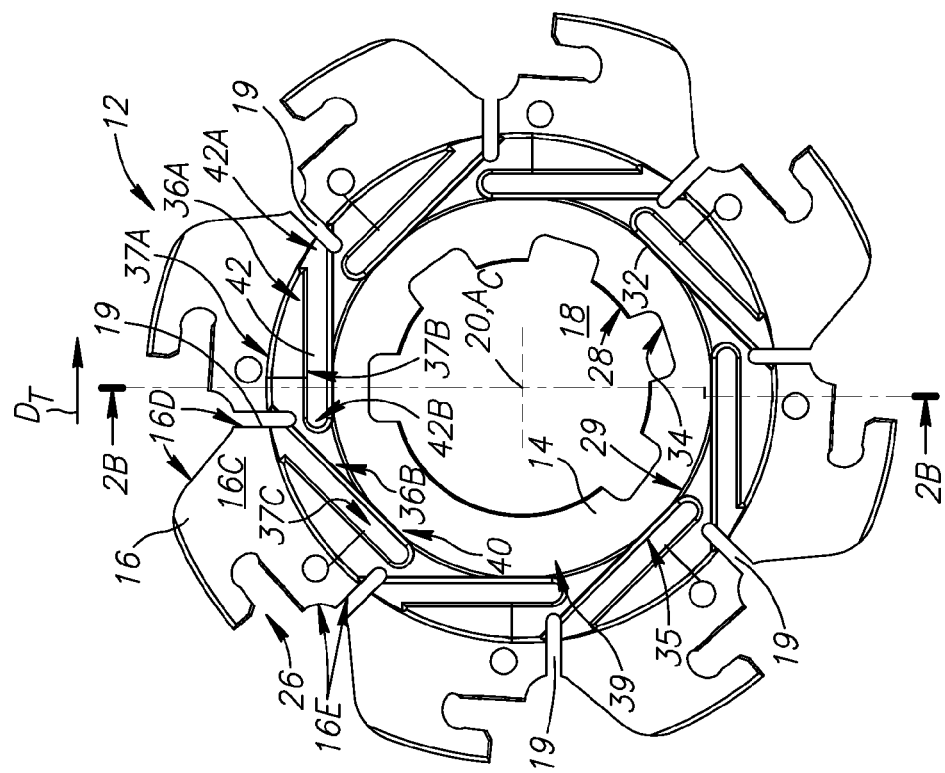
FIG.2B
FIG.2C

CUTTING BODY CONFIGURED FOR FINE-TUNING AND METAL-WORKING MACHINE TOOL COMPRISING A PLURALITY THEREOF

RELATED APPLICATIONS

The present application claims priority to U.S. Provisional Patent Application No. 61/509,261, filed 19 Jul. 2011, whose contents are incorporated by reference in their entirety.

FIELD OF THE INVENTION

The subject matter of the present application relates generally to tools designed for chip-removal designed for use with metal-working machines, and in particular a cutting body and tools having a plurality of such cutting bodies. More particularly, each cutting body is configured for fine-tuning or adjustment of position of one or more cutting portions thereof.

BACKGROUND OF THE INVENTION

Tools can be provided with one or more cutting bodies and configured to simultaneously cut one or more slots or grooves in, or part, a workpiece.

Such cutting bodies can each be provided with a cutting portion having an integral cutting edge or configured to hold a cutting insert having a cutting edge in an insert pocket.

Adjustment or fine-tuning of the position of the cutting portion and consequently a cutting edge thereof can allow precise positioning for high-precision cutting operations.

Various cutting bodies and tools are disclosed in U.S. Pat. No. 4,547,100, U.S. Pat. No. 6,056,484, U.S. Pat. No. 6,702,526, U.S. Pat. No. 7,086,812, U.S. Pat. No. 7,402,010 and U.S. Pat. No. 6,431,799.

SUMMARY OF THE INVENTION

In accordance with a first aspect of the subject matter of the present application, there is provided a cutting body for a metal-working machine tool for chip removal configured for fine-tuning of the position of a cutting portion thereof.

More precisely, the cutting body can comprise a body portion, a cutting portion extending from the body portion, and a biasing member; the body portion comprising an inner sub-portion and an outer sub-portion disposed between the inner sub-portion and the cutting portion; the outer sub-portion comprising adjacent first and second sections; the first section extending between the inner sub-portion and the cutting portion, and comprising a face adjacent the second section; the second section comprising a biasing surface extending transverse relative to the first section's face, and a biasing sub-portion holding the biasing member and integrally connected to the first section's face; the first section being configured to elastically bend upon actuation of the biasing member due to application of force on the biasing surface by the biasing member, thereby changing position of the cutting portion for fine-tuning thereof.

It will be understood that the first section can be configured to bend by, e.g., it having a smaller thickness than adjacent portions of the cutting body. Such adjacent portion can be the inner sub-portion.

In accordance with another aspect of the subject matter of the present application, there is provided a cutting body comprising a cutting portion extending from a body portion which is configured to fine-tune the position of the cutting portion; the body portion comprising an inner sub-portion and an outer sub-portion disposed between the inner sub-portion and the cutting portion; the outer sub-portion comprising a section configured to elastically bend and a biasing sub-portion which is configured to hold a biasing member and is located closer to the cutting portion than the section configured to elastically bend.

In accordance with yet another aspect of the subject matter of the present application, there is provided a cutting body comprising a cutting portion extending from a body portion which is configured to fine-tune the position of the cutting portion; the cutting portion only being connected to the body portion on one side thereof, to allow bending of the cutting portion without affecting other portions of the cutting body; the body portion further comprising a biasing groove that extends below the cutting portion to further allow bending thereof, and a biasing sub-portion and biasing surface disposed on opposing sides of the biasing groove; the biasing sub-portion and biasing surface being configured to cooperate with a biasing member to cause said bending.

In accordance with still another aspect of the subject matter of the present application, there is provided a cutting body, comprising a body portion having a biasing sub-portion and a biasing surface; a cutting portion extending from the body portion in a first direction; and a biasing member having an end surface, the biasing member retained by the biasing sub-portion with the end surface of the biasing member contacting the biasing surface, wherein: the biasing member applies a first force against the biasing surface in a direction generally opposite to the first direction; and the biasing member applies a second force against the biasing sub-portion in a transverse direction to thereby change a position of the cutting portion for fine-tuning thereof.

In accordance with a further aspect of the subject matter of the present application, there is provided a machine tool comprising a plurality of cutting bodies. Each of the cutting bodies can have any of the features described hereinabove and below.

In accordance with still a further aspect of the subject matter of the present application, there is provided a method of fine-tuning a cutting body having any of the features mentioned hereinabove or below. The method can comprise the steps of:

- moving the biasing sub-portion relative to the biasing surface via movement of the biasing member in a first direction, thereby causing the first section to bend in a first calibration direction and change a position of the cutting portion extending therefrom;
- halting movement of the biasing member in a first direction when a predetermined angle is reached;
- moving the biasing member in a second direction, opposite to the first direction, allowing elasticity of the first section to move the cutting portion in a second calibration direction which is opposite to the first direction; and
- halting movement of the biasing member when a desired fine-tuning position is reached.

It will be understood that the above-said is a summary, and that any of the aspects above may further comprise any of the features described in connection with any of the other aspects or described hereinbelow. Specifically, the following features, either alone or in combination, may be applicable to any of the above aspects:

A. A cutting body can be formed with a recess can be formed between adjacent cutting portions.

B. A cutting portion can be surrounded by recesses on both sides thereof to allow independent bending. A cutting portion can be associated with a biasing groove that extends therebelow along a majority of the cutting portion to provide uniform bending of the cutting portion. A cutting portion can be associated with an anchoring sub-portion which can be configured to restrict bending movement of the cutting portion.

C. A second section can be formed with a gap located between a biasing sub-portion and a biasing surface. The gap can be part of an elongated biasing groove. The biasing groove can extend tangentially, for example, in a case where the body portion is disc-shaped. The second section can comprise an anchoring sub-portion connected between an inner sub-portion and the biasing sub-portion, for regulating or restricting bending movement of an associated cutting portion.

D. A biasing sub-portion can be closer to the cutting portion than the biasing surface. The biasing sub-portion can be formed with a threaded bore directed towards the biasing surface and having a bore central axis extending through a center thereof. The biasing sub-portion can be configured to hold a biasing member. The threaded bore and/or the biasing member can comprise a rotation inhibitor arrangement. It has been found that such arrangement can assist in maintaining a precise desired position, even in, but not limited to, usage of biasing members in rotary tools such as the one exemplified below. It has been found that the rotation inhibitor arrangement can be a patch secured to the threading thereof. It is believed that the use of patches to prevent movement of a biasing member configured to fine-tune a cutting body of a metal-working tool, in particular a rotating tool, is heretofore unknown. The rotation inhibitor arrangement can be threading of the threaded bore, the threading being configured with a pitch smaller than that defined by the standard DIN 913 ISO 4026.

E. A first direction can be defined from the body portion to the cutting portion. More precisely, the first direction can be coaxial with a central axis of a biasing sub-portion. A second direction can be defined as perpendicular to the first direction. In embodiments where a body portion is elongated, the first direction can be a longitudinal direction. In embodiments where a body portion is disc-shaped, the first direction can be a radial direction. Each recess between adjacent cutting portions can extend parallel to the first direction. A biasing groove can extend in the second direction. In embodiments where the body portion is disc-shaped, the direction of the biasing groove can be perpendicular to both the first direction and an axial direction, i.e., a tangential direction.

F. A body portion can be disc-shaped. In such case each recess between adjacent cutting portions can extend radially. A threaded bore can extend radially. The bore central axis of the bore can form an angle α with the biasing surface between 88.5° to 92.5°. In an unbiased state, the bore central axis can form an obtuse angle α with the biasing surface. In such case a preferred obtuse angle can be 91.5°. In an unbiased state, the bore central axis can form an acute angle α with the biasing surface. In such case a preferred acute angle can be 88.5°. It will be understood that according to some embodiments, such as the example shown below, an obtuse angle is preferred since actuating the biasing member to contact the biasing surface closer to the first section can result in a smaller force than would be the case if the biasing member contacted the biasing surface further from the first section. Accordingly the cutting body is less sensitive to actuation of the biasing member and may be easier to accurately tune. However, in embodiments where the cutting body is less bendable (e.g. due to different thicknesses or materials used), it is envisioned that an acute angle α may be preferred.

G. The cutting portion can be only connected to the body portion on one side thereof, to allow bending of the cutting portion without affecting other portions of the cutting body. The body portion can comprise an elongated biasing groove that extends below the cutting portion to further allow localized and uniform bending of the cutting portion The biasing sub-portion and the biasing surface can be disposed on opposing sides of the biasing groove.

H. Any or each of the cutting bodies can abut at least one adjacent cutting body.

I. A body portion can be disc-shaped and have a body central axis.

J. A first force can be applied by a biasing member in a generally radially inward direction.

K. A second force can be applied by the biasing member, via the biasing sub-portion, in a generally axial direction.

L. A method of fine-tuning can comprise, before step (a) mentioned above, a step of securing adjacent cutting bodies in an abutting manner to each other.

M. A method of fine-tuning can comprise, moving the biasing sub-portion relative to the biasing surface by moving the biasing sub-portion away from the biasing surface.

BRIEF DESCRIPTION OF THE DRAWINGS

For a better understanding of the subject matter of the present application, and to show how the same may be carried out in practice, reference will now be made to the accompanying drawings, in which:

FIG. 2A is a front view of a cutting body of the cutting tool shown in FIGS. 1A to 1C, not including biasing members or cutting inserts;

FIG. 2B is a cross section view taken along line 2B-2B in FIG. 2A; and

FIG. 2C is an enlarged view of portion A in FIG. 2B, further including a biasing member and a cutting insert.

Figure 1B:
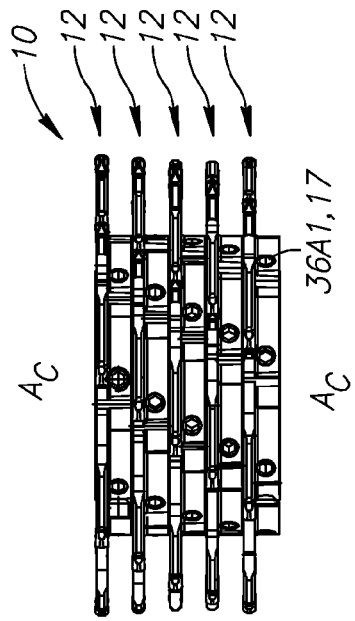
FIG. 1B is a front view of the cutting tool in FIG. 1A.

Where considered appropriate, reference numerals may be repeated among the figures to indicate corresponding or analogous elements.

DETAILED DESCRIPTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific details presented herein.

Figure 1C:
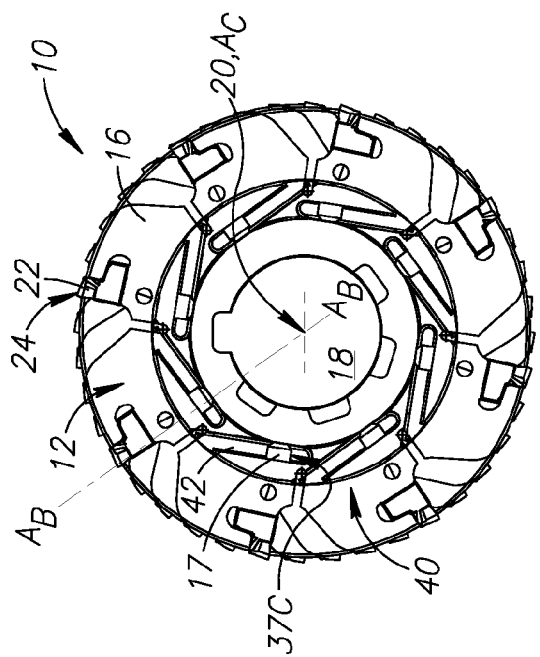
FIG. 1C is a side view of the cutting tool in FIGS. 1A and 1B.
Figure 1A:
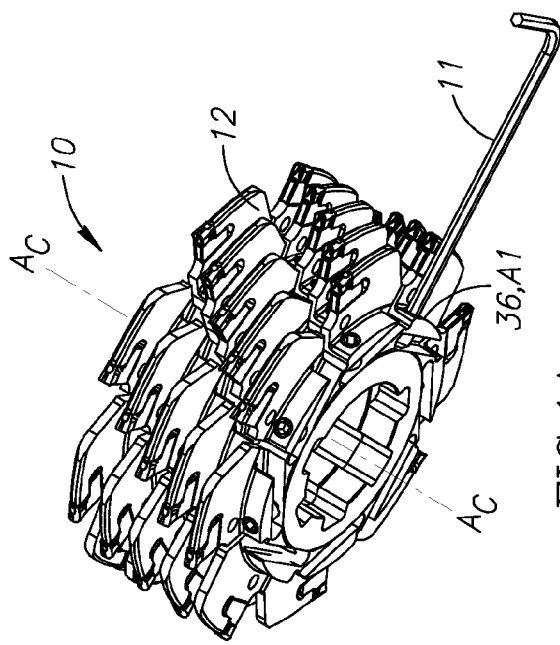
FIG. 1A is a perspective view of a cutting tool and screwing tool therefor.

Reference is made to FIGS. 1A to 1C, which show a tool 10 for metal cutting operations, which in this non-limiting example is a rotary tool, comprising a plurality of cutting bodies 12, and a standard rotating/fastening tool 11 (FIG. 1A), which in this example can be an Allen key, for fine-tuning the cutting bodies 12.

In this non-limiting example, there are five cutting bodies 12 disposed directly adjacent to each other (as shown in FIG. 1C, the tool 10 is free of gaps between adjacent cutting bodies 12). More precisely, each cutting body 12 can be secured in an abutting manner to each adjacent cutting body 12. Such arrangement can allow multiple closely spaced cuts to be made.

A central aperture 18 can be formed in the center of the cutting body 12. A body central axis $A_C$ can pass through the middle or mid-point 20 of the cutting body 12, which in this example can coincide with a mid-point of the central aperture 18. In embodiments where the cutting body 12 is configured to be used in a rotating tool, the cutting body 12 can be configured for rotation about the body central axis $A_C$.

Referring also to FIG. 2B, each cutting body 12 can comprise a body portion 14, a cutting portion 16 extending radially-outward therefrom, and a biasing member 17 (FIG. 2C) respectively associated with, and configured for orienting, each associated cutting portion 16.

In the specification and the claims, references to directions including the terms 'axial' and 'radial' are made relative to the body central axis $A_C$.

The cutting portions 16 can be circumferentially spaced, equally or otherwise, about the body portion 14. The cutting portions 16 can be disposed in a staggered arrangement with respect to the cutting portions 16 of adjacent cutting bodies 12 (best shown in FIG. 1A). Each cutting portion 16 can be unconnected to or, stated differently, spaced apart from adjacent cutting portions 16. More precisely, each cutting body 12 can be formed with a recess 19 (FIG. 2A) formed between adjacent cutting portions 16. Each recess 19 can extend to the body portion 14 and can extend, in this example of a disc-shaped tool, in a radial direction $D_R$. Each cutting portion 16 can be configured for bending motion independent of position of adjacent cutting portions 16.

Each cutting portion 16 can have a planar shape (e.g., as shown in the side view in FIG. 1C).

Referring, in particular, to FIG. 2C, each cutting portion 16 can extend from the body portion 14 and terminate at an opposing top end 16A. Each cutting portion 16 can have axially facing first and second major side surfaces 16B, 16C, which can be parallel to each other and can extend from the body portion 14 to the top end 16A. Each cutting portion 16 can have a magnitude of thickness $T_C$ (FIG. 2B), between the first and second side major surfaces 16B, 16C.

Referring in particular to FIG. 2A, each cutting portion 16 can have first and second minor side surfaces 16D, 16E. The first and second minor side surfaces 16D, 16E can be located on opposing sides of an associated cutting portion 16. The first and second minor side surfaces 16D, 16E can each extend between the body portion 14, the top end 16A and the first and second major side surfaces 16B, 16C.

As best shown in FIG. 1B, in this non-limiting example, each cutting portion 16 can further have an insert 22 secured thereto in a removable manner. Each insert 22 has a cutting edge 24 disposed peripherally along the cutting body 12. It will be appreciated that the subject matter of the present application is not limited to any particular type of cutting portion 16, insert 22 or cutting edge 24. In any case, according to some embodiments, each cutting portion 16 is formed with a pocket 26 (FIG. 2A), to which the insert 22 is mounted.

As best shown in FIG. 2A, the body portion 14 can be disc-shaped.

As best understood from FIG. 2B, the body portion 14 can comprise an inner sub-portion 39 and an outer sub-portion 40 extending between the inner sub-portion 39 and each of the cutting portions 16.

As can be understood from FIGS. 2A and 2B, the inner sub-portion 39 can have a cylindrical shape.

As best shown in FIG. 2A, the inner sub-portion 39 can be defined between an inner peripheral end 28, an outer peripheral end 29, and first and second side surfaces 30, 32 extending therebetween.

Referring to FIG. 2B, the inner sub-portion 39 can have a magnitude of radial depth $D_H$. Such radial depth $D_H$ can be defined between the inner peripheral end 28 and the outer peripheral end 29.

As in the present example, the inner peripheral end 28 can be formed with recesses 34 (FIG. 2A) configured for connection with a rotating shaft (not shown). However, per application, the inner sub-portion 39 can have a solid or uniform construction, stated differently, the inner sub-portion 39 can be devoid of recesses or hollow areas.

The first and second side surfaces 30, 32 can extend perpendicular to the body central axis $A_C$ (in this example in a radial plane including the radial direction $D_R$).

Referring now to FIG. 2C, the outer peripheral end 29 can be disposed at an intersection with the outer sub-portion 40.

The outer sub-portion 40 can comprise adjacent first and second sections 40A, 40B.

Referring also to FIG. 2B, the first section 40A can extend between the inner sub-portion 39 and the cutting portion 16. The first section 40A can have opposing first and second faces 40A1, 40A2.

The first face 40A1 can extend between the inner sub-portion's first side surface 30 and the first major side surface 16B of the associated cutting portion 16. The second face 40A2 can extend from the second major side surface 16C of the associated cutting portion 16 toward the inner sub-portion 39.

The second section 40B can be located radially outward from the inner sub-portion 39 and axially outward from the first section 40A. The second section 40B can comprise a biasing sub-portion 36A and a biasing surface 35 which faces in a generally radially outward direction. The second section 40B can also comprise an anchoring sub-portion 36B (FIG. 2A).

Further to defining the biasing surface 35, a more precise definition of the first section 40A can be that it extends from the inner sub-portion 39, which ends adjacent the biasing surface 35, until an associated cutting portion 16, which starts adjacent to an upper edge 37A of the biasing sub-portion 36A.

The biasing sub-portion 36A can extend from the second face 40A2 of the first section 40A. The biasing sub-portion 36A can extend between the upper edge 37A and a lower edge 37B thereof. The upper and/or lower edges 37A, 37B can extend perpendicular to the second face 40A2. The upper edge 37A can be located further than the lower edge 37B from the body central axis $A_C$. The lower edge 37B can terminate at a location spaced apart from the biasing surface 35. Stated differently, there can be a gap 37C between the lower edge 37B and the biasing surface 35. The biasing sub-portion 36A can be formed with an internally threaded bore 36A1 (FIG. 2B). The biasing sub-portion 36A can be elongated (best shown in FIG. 2A, in which an exemplary airfoil-like shape is shown). Such elongation can extend from the recess 19 associated with the second minor side surface 16E of the associated cutting portion 16 in a direction towards another one of the recesses 19 which is associated with the first minor side surface 16D of the same cutting portion 16. The elongation can extend along a majority of the distance between the recesses 19 of an associated cutting portion 16.

The lower edge 37B can be flat. The flat lower edge 37B can extend in a direction tangential ($D_T$) to the body central axis A.

The upper edge 37A can be curved. The curved upper edge 37A can extend parallel with a portion of the biasing surface 35.

A portion of the biasing surface 35 aligned with the threaded bore 36A1 can coincide with or, stated differently, co-constitute a portion of the outer peripheral end 29.

A bore central axis $A_B$ (FIG. 2B) can extend through the center of threaded bore 36A1. The threaded bore 36A1 can extend radially. Stated differently, the bore central axis $A_B$ can intersect or can extend proximate to the center 20 of the cutting body 12. In an unbiased state, i.e., when the biasing member 17 is not applying forces to the biasing surface 35, the biasing surface 35 can form an angle α (shown in FIG. 2B, i.e., such angle can be seen in a side view) with the bore central axis $A_B$ of the threaded bore 36A1. The angle α can be between 88.5° to 92.5°, depending on a desired application. In this non-limiting example, the angle α is 91.5° (the slant of the biasing surface 35 in FIGS. 2B and 2C has been exaggerated for ease of visibility). An obtuse angle, for example 91.5°, is believed to be advantageous over an acute angle, for example 88.5°, due to reduced sensitivity of the cutting portion 16 upon adjustment of the biasing member 17. However, there may be cases where such amplified sensitivity is desired. Accordingly, it is preferred that the angle fulfill the condition 88.5°<α<92.5°. Similarly, while an angle of 90° is feasible, it is preferred that the angle α is other than 90° (α≠90°), which may affect force needed to initially move the biasing member 17. Regardless of the angle α in the unbiased state, the bending motion according to some embodiments can allow a range of movement of the associated cutting portion 16 of between 88.5° to 92.5°. Such range can be sufficient for fine-tuning while requiring a small number of turns of the fastening tool 11.

The second section 40B can be formed with a biasing groove 42. The gap 37C can constitute a part of the biasing groove 42. The biasing groove 42 can have a first end 42A, which can open out to the recess 19 associated with the minor second side surface 16D of an associated cutting portion 16. The biasing groove 42 can have a closed second end 42B, terminating between the recess 19 associated with the minor first side surface 16E of an associated cutting portion 16 and the inner sub-portion 39 of the body portion 14. The biasing groove 42 can extend in the tangential direction $D_T$. The biasing groove 42 can be defined between the lower edge 37B (FIG. 2B) of the biasing sub-portion 36A, the biasing surface 35 (FIG. 2C), and the second face 40A2 (FIG. 2B) of the first section 40A.

It will be understood that the biasing groove 42 can be configured to provide localized flexibility to the cutting body 12. More specifically, the biasing groove 42 provides flexibility to the outer sub-portion 40 relative to the inner sub-portion 39, at an area disposed between the inner sub-portion 39 and an associated cutting portion 16. The elongation of the biasing groove 42 can correspond to an elongation of an associated cutting portion 16, to allow uniform bending movement to the entire associated cutting portion 16.

The recesses 19 can also allow localized flexibility. The recesses 19 can serve to isolate the cutting portions 16 from each other. Consequently, the recesses 19 can allow uniform bending movement to the entire associated cutting portion 16. Notably, the recesses 19 can be formed between the cutting portions 16 and can also be formed in the outer sub-portion 40.

The anchoring sub-portion 36B (FIG. 2A) can extend from the outer peripheral end 29 to the biasing sub-portion 36A thereby forming a linkage or neck therebetween. The anchoring sub-portion 36B can be defined between adjacent biasing grooves 42 and an associated recess 19 adjacent thereto. The anchoring sub-portion 36B can regulate bending movement of an associated cutting portion 16. Stated differently, the anchoring sub-portion 36B can limit bending movement of an associated cutting portion 16. Such regulation or limitation on the bending can counterbalance the elements which are designed to increase flexibility.

It will be understood that each biasing groove 42 could feasibly extend from the first end 42A and open out to an adjacent biasing groove 42, i.e., being formed free of a second end 42B. However the provision of an anchoring sub-portion 36B can possibly be advantageous for restricting overextension (i.e., excessive bending) of an associated cutting portion 16.

The biasing member 17, in this non-limiting example, can be a screw with external threading 17C. It will be understood that the biasing member could be other than a screw, for example, a non-threaded lever or clamp member. The biasing member 17 can have a flat end 17A for engagement with the biasing surface 35. The biasing member 17 can have a length shorter than a length between the upper edge 37A and the biasing surface 35, so that it does not protrude from the biasing sub-portion 36A, in a direction towards an associated cutting portion 16, when mounted to the threaded bore 36A1. It is believed to be possibly advantageous for the biasing member 17 to be configured with a rotation inhibitor arrangement 17B. Such rotation inhibitor arrangement 17B can be, for example, a nylon patch secured to the external threading 17C of the screw, at least where the part which is to engage the threaded bore 36A1 during a cutting operation. Such patch can be configured to inhibit undesired rotation of the biasing member 17 in the threaded bore 36A1 during cutting operation of the associated cutting body 16. A suitable example patch is sold by the Bossard Group under the trade name Tuflok®. The patch could alternatively, or additionally, be applied to the threaded bore 36A1. Alternatively, such rotation inhibitor arrangement 17B could be the biasing member 17 having threading with a small pitch, i.e., pitch smaller than that defined by the International Organization for Standardization (ISO), for example smaller than that defined by the standard DIN 913 ISO 4026.

In operation, the biasing member 17 can be inserted in the threaded bore 36A1. The biasing member 17 can be rotated via the tool 11 (FIG. 1A) in the threaded bore 36A1 until it touches the biasing surface 35 but does not apply force thereto, i.e., the cutting body 12 being in an unbiased state. During adjustment for a cutting operation, every biasing member 17 can initially be rotated further into the threaded bore 36A1 so that it applies force to the biasing surface 35. As the first section 40A is more flexible than the inner sub-portion 39, which in this non-limiting example is a result of the magnitude of thickness $T_C$ (of the first section 40A) being smaller than the magnitude of radial depth $D_H$ (of the inner sub-portion 39), the first section 40A bends in the direction $D_B$ (FIG. 2C; the bending not being shown). The initial biasing is to a predetermined maximum bending angle, which in this non-limiting example can be the end of a bending range, for example α=92.5°. Each cutting portion 16 can then be calibrated to a desired position by rotating the biasing member 17 in an opposite direction until a desired bending angle between the unbiased state and the maximum bending angle is reached, which in this non-limiting example is 91.5° (FIG. 2B).

It will be understood that in a case where the unbiased state has an acute angle, such as 88.5°, the initial rotation can be to a predetermined maximum bending angle of 90° and the desired position can be achieved by rotating the biasing member 17 in an opposite direction until a desired bending angle between the unbiased state of 88.5° and the maximum bending angle is reached.

Notably, in the examples above, elasticity of the material of the first section 40A causes the first section 40A to revert to the desired bending angle from the initial maximum bending angle.

It will be understood that each cutting body 12 can be made of an elastic material, for example steel. However, it will be understood that, in a case where a cutting body is made of a plurality of materials, at least the body portion 14, and more specifically, at least the first section 40A thereof, is preferably made of an elastic material.

A possible advantage of the radial orientation of the threaded bore 36A1 (best seen in FIG. 1C) can be ease of access to rotate a biasing member 17 disposed therein, as a radial direction is more easily viewed and/or accessible than other directions. Stated differently, the subject matter of the present application can allow a plurality of cutting bodies to be mounted or packed directly adjacent to each another and to be adjusted while in this position.

It will be understood that feasible alternative arrangements could be, for example, the threaded bore 36A1 could be slanted with respect to the second face 40A2 or cutting portion 16. Similarly, the axis $A_B$ could be slanted with respect to the second face 40A2 or cutting portion 16, and the biasing surface 35 could be, for example, perpendicular to the second face 40A2 or cutting portion 16.

In this non-limiting example, the tool 10 is a so-called slotting-cutter, configured for simultaneously cutting a plurality of slots or grooves, and can also be configured to carry out simultaneous multiple parting of a workpiece, as desired. However, it will be appreciated that other types of rotary tools, or non-rotary tools, in particular of the type having multiple blades, could also constitute a tool, or cutting body, in accordance with the subject matter of the present application. It will be understood that names of elements and directions described which relate to a rotary cutting portion or tool would be changed for a non-rotary cutting portion or tool, mutatis mutandis. For example a radial direction mentioned above may be a first direction or longitudinal direction for an elongated blade-shaped tool. In all such cases, the biasing member applies a first force on the biasing surface in one direction, and applies a second force against the biasing sub-portion in a transverse direction to thereby change a position of the cutting portion for fine-tuning thereof.

Notably, the biasing member 17, in the non-limiting example shown, is distinct from any clamping mechanism of the cutting portion 16, i.e., relating to the cutting insert 22 or the cutting edge 24. More precisely, the cutting portion 16 is devoid of biasing elements or portions. Accordingly, there is no thickness limitation of the cutting portion 16 caused by a biasing elements or portions such as a threaded bore, biasing member or portion, on the cutting portion 16. A possible advantage of this arrangement can be that a cutting portion is not limited to a width required for accommodating biasing elements and an extremely thin cut or plurality of cuts, especially in a case where there are multiple adjacent cutting bodies, can be achieved. It will be understood that the orientation of the threaded bore 36A1 (i.e., in this example being radially oriented), can allow an operator access even in the compact arrangement shown.

Further, in this non-limiting example, one or more of (a) the biasing member 17, (b) the biasing surface 35, and (c) the threaded bore 36A1 are disposed between an associated cutting portion 16 and the center 20 of the cutting body 12. Stated differently, the biasing member 17 and/or the biasing surface 35 and/or the threaded bore 36A1 are located closer to the center 20 of the cutting body 12 than the cutting portion 16.

Another possible advantage of the subject matter of the present application is that a cutting body is provided which is configured to be flexible at an intersection of a cutting portion and body portion thereof for allowing adjustment of the cutting portion position. In addition to the flexible region, the cutting portion can have an anchoring arrangement to regulate the flexibility, stabilize or restrict excessive movement of the cutting portion.

While the subject matter of the present application has been described with reference to one or more specific embodiments, the description is intended to be illustrative as a whole and is not to be construed as limiting the subject matter of the present application to the embodiments shown. It is appreciated that various modifications may occur to those skilled in the art that, while not specifically shown herein, are nevertheless within the scope of the subject matter of the present application.

What is claimed is:

1. A cutting body for a metal-working machine tool for chip removal, comprising
a body portion,
a cutting portion extending from the body portion, and
a biasing member;
the body portion comprising
an inner sub-portion and
an outer sub-portion disposed between the inner sub-portion and the cutting portion;
the outer sub-portion comprising adjacent first and second sections;
the first section extending between the inner sub-portion and the cutting portion, and comprising a face adjacent the second section;
the second section comprising
a biasing surface extending transverse relative to the first section's face, and
a biasing sub-portion holding the biasing member and integrally connected to the first section's face;
the first section being configured to elastically bend upon actuation of the biasing member due to application of force on the biasing surface by the biasing member, thereby changing position of the cutting portion for fine-tuning thereof without changing position of the biasing sub-portion relative to the first section's face.

2. The cutting body according to claim 1, further comprising at least one additional cutting portion, wherein a recess is formed between adjacent cutting portions.

3. The cutting body according to claim 2, wherein a first direction is defined from the body portion to the cutting portion and each recess between adjacent cutting portions extends parallel to the first direction.

4. The cutting body according to claim 1, wherein the second section is formed with a gap located between the biasing sub-portion and the biasing surface.

5. The cutting body according to claim 4, wherein the gap is part of an elongated biasing groove.

6. The cutting body according to claim 5, wherein the biasing groove extends in a direction which is perpendicular to a first direction defined from the body portion to the cutting portion.

7. The cutting body according to claim 1, wherein the second section further comprises an anchoring sub-portion connected between the inner sub-portion and the biasing sub-portion, for restricting bending movement of the cutting portion.

8. The cutting body according to claim 1, wherein the biasing sub-portion is closer to the cutting portion than the biasing surface.

9. The cutting body according to claim 1, wherein the biasing sub-portion is formed with a threaded bore directed towards the biasing surface and having a bore central axis extending through a center thereof.

10. The cutting body according to claim 9, wherein:
the body portion is disc-shaped;
the threaded bore extends in a radial direction; and
a biasing groove extends in a tangential direction.

11. The cutting body according to claim 9, wherein the bore central axis forms an angle α with the biasing surface between 88.5° to 92.5°.

12. The cutting body according to claim 11, wherein, in an unbiased state, the an angle α is other than 90°.

13. The cutting body according to claim 9, wherein the threaded bore and/or biasing member further comprises a rotation inhibitor arrangement.

14. The cutting body according to claim 13, wherein the rotation inhibitor arrangement is a patch or pitch smaller than that defined by the standard DIN 913 ISO 4026.

15. The cutting body according to claim 1, wherein the cutting portion is only connected to the body portion on one side thereof, to allow bending of the cutting portion without affecting other portions of the cutting body; the body portion further comprising an elongated biasing groove that extends below the cutting portion to further allow localized and uniform bending of the cutting portion, and the biasing sub-portion and the biasing surface are disposed on opposing sides of the biasing groove.

16. A machine tool for chip removal comprising a plurality of cutting bodies according to claim 1.

17. The machine tool according to claim 16, wherein each of the cutting bodies abuts at least one adjacent cutting body.

18. A method of fine-tuning position of a cutting portion of a cutting body according to claim 1, comprising the steps of:
(a) moving the biasing sub-portion relative to the biasing surface via movement of the biasing member in a first direction, thereby causing the first section to bend in a first calibration direction and change a position of the cutting portion extending therefrom;
(b) halting movement of the biasing member in a first direction when a predetermined angle is reached;
(c) moving the biasing member in a second direction, opposite to the first direction, allowing elasticity of the first section to move the cutting portion in a second calibration direction which is opposite to the first direction; and
(d) halting movement of the biasing member when a desired fine-tuning position is reached.

19. The method according to claim 18, wherein before step (a), there is a step of securing adjacent cutting bodies in an abutting manner to each other.

20. The method according to claim 18, wherein step (a) further includes moving the biasing sub-portion away from the biasing surface.

* * * * *